US005722623A

United States Patent [19]

Gibson

[11] Patent Number: 5,722,623

[45] Date of Patent: Mar. 3, 1998

[54] UPRIGHT DISPLAY ASSEMBLY

[75] Inventor: Scott Stephen Gibson, Mercer Island, Wash.

[73] Assignee: Burke Gibson, Inc., Auburn, Wash.

[21] Appl. No.: 718,098

[22] Filed: Sep. 18, 1996

[51] Int. Cl.[6] .............................................. F16M 11/00

[52] U.S. Cl. ............................ 248/201; 40/745; 40/757

[58] Field of Search ............................ 298/201, 205.1, 298/220.21, 220.41, 229.15, 229.16, 229.25, 229.26, 228.6, 228.7; 40/124.05, 661.03, 745, 757, 761; 211/94

[56] References Cited

U.S. PATENT DOCUMENTS

| | | | |
|---|---|---|---|
| Re. 30,734 | 9/1981 | Eckert . | |
| D. 110,856 | 8/1938 | Berger . | |
| D. 161,735 | 1/1951 | Chapman . | |
| D. 162,637 | 3/1951 | Ernst . | |
| 1,559,010 | 10/1925 | Schwieger . | |
| 1,793,563 | 2/1931 | Schwartz . | |
| 1,866,723 | 7/1932 | Powers . | |
| 2,080,325 | 5/1937 | Lowmaster . | |
| 2,646,241 | 7/1953 | McLean | 248/289.11 |
| 2,741,572 | 4/1956 | Lennartz . | |
| 2,787,433 | 4/1957 | Slavsky et al. . | |
| 3,008,254 | 11/1961 | Smith . | |
| 3,015,897 | 1/1962 | Hopp | 40/650 |
| 3,102,351 | 9/1963 | Howell . | |
| 3,425,147 | 2/1969 | Marx . | |
| 3,529,798 | 9/1970 | Williams et al. . | |
| 3,665,628 | 5/1972 | Dammond . | |
| 3,740,881 | 6/1973 | Finger . | |
| 3,969,838 | 7/1976 | Moore . | |
| 3,977,109 | 8/1976 | Berry, Jr. et al. | 40/124.05 |
| 4,282,667 | 8/1981 | Glade . | |
| 4,344,244 | 8/1982 | Tyke . | |
| 4,405,110 | 9/1983 | Gibbons | 248/220.41 X |
| 4,531,311 | 7/1985 | Howard et al. . | |
| 4,574,507 | 3/1986 | Elliott . | |
| 4,593,486 | 6/1986 | Visocky et al. . | |
| 4,616,799 | 10/1986 | Rebentisch | 248/289.31 |
| 4,709,891 | 12/1987 | Barnett | 248/214 |
| 4,729,183 | 3/1988 | Tarter et al. . | |
| 4,753,026 | 6/1988 | Woodman et al. . | |
| 4,791,739 | 12/1988 | Hetzer . | |
| 4,805,331 | 2/1989 | Boggess et al. . | |
| 4,866,867 | 9/1989 | Clark . | |
| 4,881,707 | 11/1989 | Garfinkle | 248/278.1 |
| 4,884,351 | 12/1989 | Abramson . | |
| 4,909,464 | 3/1990 | Levine et al. | 248/225.11 |
| 4,957,256 | 9/1990 | Boeding | 248/225.11 |
| 5,111,606 | 5/1992 | Reynolds | 40/661.03 |
| 5,189,822 | 3/1993 | Schmanski et al. | 40/611 |
| 5,233,773 | 8/1993 | Reynolds | 40/661.03 |
| 5,419,134 | 5/1995 | Gibson | 248/548 X |
| 5,511,332 | 4/1996 | Sturkie et al. | 40/661.03 |

FOREIGN PATENT DOCUMENTS

| | | |
|---|---|---|
| 2345115 | 10/1977 | France . |

*Primary Examiner*—Ramon O. Ramirez
*Attorney, Agent, or Firm*—Glenn D. Bellamy

[57] ABSTRACT

An upright display assembly (10) including a display holder (12), a set of display mounting brackets (14), and a set of extension pieces (16, 18). Each display mounting bracket (14) includes a C-shaped clamp for attachment to the front rail of display shelving (20, 22, 24).

17 Claims, 7 Drawing Sheets

UPRIGHT DISPLAY ASSEMBLY

TECHNICAL FIELD

The present invention pertains to components for mounting display sign holders, and more particularly, to a bracket assembly for mounting a vertical display holder to one or more horizontal shelves.

BACKGROUND OF THE INVENTION

My prior U.S. Pat. No. 5,419,134, entitled "Display Holder", discloses a vertical display holder that the present invention is designed to mount to a particular horizontal shelf arrangement. This patent also lists and discusses several patents disclosing various types of sign boards that are adapted to be mounted in a vertical orientation. These patents, as well as my prior '134 patent are expressly incorporated herein.

In retail commercial establishments, various types of shelving are utilized to display goods for sale. The present invention is particularly adapted to be used in combination with horizontal shelving wherein each horizontal shelf includes a forward, leading edge rail that has an upper edge, a lower edge, and an outwardly exposed face. Some horizontal shelf arrangements have a plurality of horizontal shelves arranged in a cascading manner wherein each lower shelf extends outwardly partially forward of the shelf above it. These types of shelving arrangements present particular difficulties in designing vertical display holders for attachment thereto.

SUMMARY OF THE INVENTION

Briefly described, the present invention is designed for use in combination with a horizontally disposed shelf that has a forward edge rail having an upper edge and a lower edge and with a display holder adapted to carry a display sign in a vertical, forwardly extending position. The display holder assembly is characterized by a clamp that has an upper U-shaped portion for grabbing the upper edge of the forward edge rail and a lower U-shaped portion for grabbing the lower edge of the forward edge rail. The upper and lower U-shaped clamps are joined in a manner that permits the two U-shaped clamps to move apart so that the clamp can be pressed against and snap-fitted onto the forward edge rail. The assembly further includes a display holder mount extending from the clamp. The display holder mount is adapted to support the display holder in its vertical, forwardly extending position.

According to an aspect of the invention, the display holder assembly is characterized by first and second brackets adjustably mounted to the display holder. The first bracket is adapted to clamp onto the forward edge of a first shelf. The assembly also includes an extension piece that is adapted to attach to the second bracket and to clamp onto the forward edge of a second shelf. The first shelf is positioned forwardly of the second shelf a distance approximately equal to the length of the extension piece, so that a display sign is held by the assembly in an upright, vertical position.

According to another aspect of the invention, the forward edges of the first and second shelves include an angled rail facing with an upper edge and a lower edge. The lower edge is positioned forwardly of the upper edge. The first and second brackets include U-shaped edges that form a clamp that is adapted to clamp onto the upper and lower edges of the rail facing. The first and second brackets each include a display holder mount for supporting the display holder in a vertical position.

According to another aspect of the invention, the clamp includes a central backing that joins the two U-shaped portions to form an elongated, substantially C-shaped clamp.

According to another aspect of the invention, the display holder includes a vertical slot along its back edge. In cooperation therewith, the display holder mount includes a stem extending from the clamp and a slide extending laterally from the stem for inserting into the vertical slot of the display holder. This arrangement allows for selective adjustment of the vertical position of the display holder mount along the display holder.

According to another aspect of the invention, the extension piece has a first end with a clamp adapted to clamp to the forward edge rail of the shelf in a manner similar to the clamp of the bracket, and a second end having a rail segment piece similar to the forward edge rail. The bracket clamp is adapted to clamp onto the rail segment piece.

Preferably, at least two extension pieces of different lengths are provided, whereby the display holder can be secured to cascading shelves by means of at least two brackets, one or more of which are mounted to the shelf by means of an extension piece.

According to an aspect of the invention, the rail segment piece includes a pair of spaced ribs, and the clamp of the bracket includes side edges that engage the spaced ribs when the bracket is attached to the extension piece. The ribs maintain the position of the bracket laterally on the extension piece.

Preferably, the clamp of the extension piece includes a handle. The handle is used to remove the clamp from the shelving.

According to an aspect of the invention, the extension piece includes a forward end that is shaped sectionally substantially in the form of the rail facing of the shelf, so that the first bracket can be clamped either to the rail facing or the forward end of the extension piece.

According to an aspect of the invention, the first and second brackets include slot mounts and the display holder includes a vertical slot along its rear edge. The slot mounts of the first and second brackets are adapted to slide in the vertical slot. The slot mounts are adapted to frictionally engage the display holder so that the first and second brackets can be selectively adjusted along the vertical slot.

Preferably, the slot mounts are canted rearwardly at a slight angle. This increases the friction between the slot mounts and the vertical slot, to assist in positioning the brackets in alignment with the shelving.

These and other features, advantages and objects of the present invention will become apparent from the following detailed description, when read in conjunction with the accompanying drawings and claims.

BRIEF DESCRIPTION OF THE DRAWINGS

Like reference numerals are used to indicate like parts throughout the various figures of the drawing, wherein.

BEST MODE FOR CARRYING OUT THE INVENTION

Figure 1:
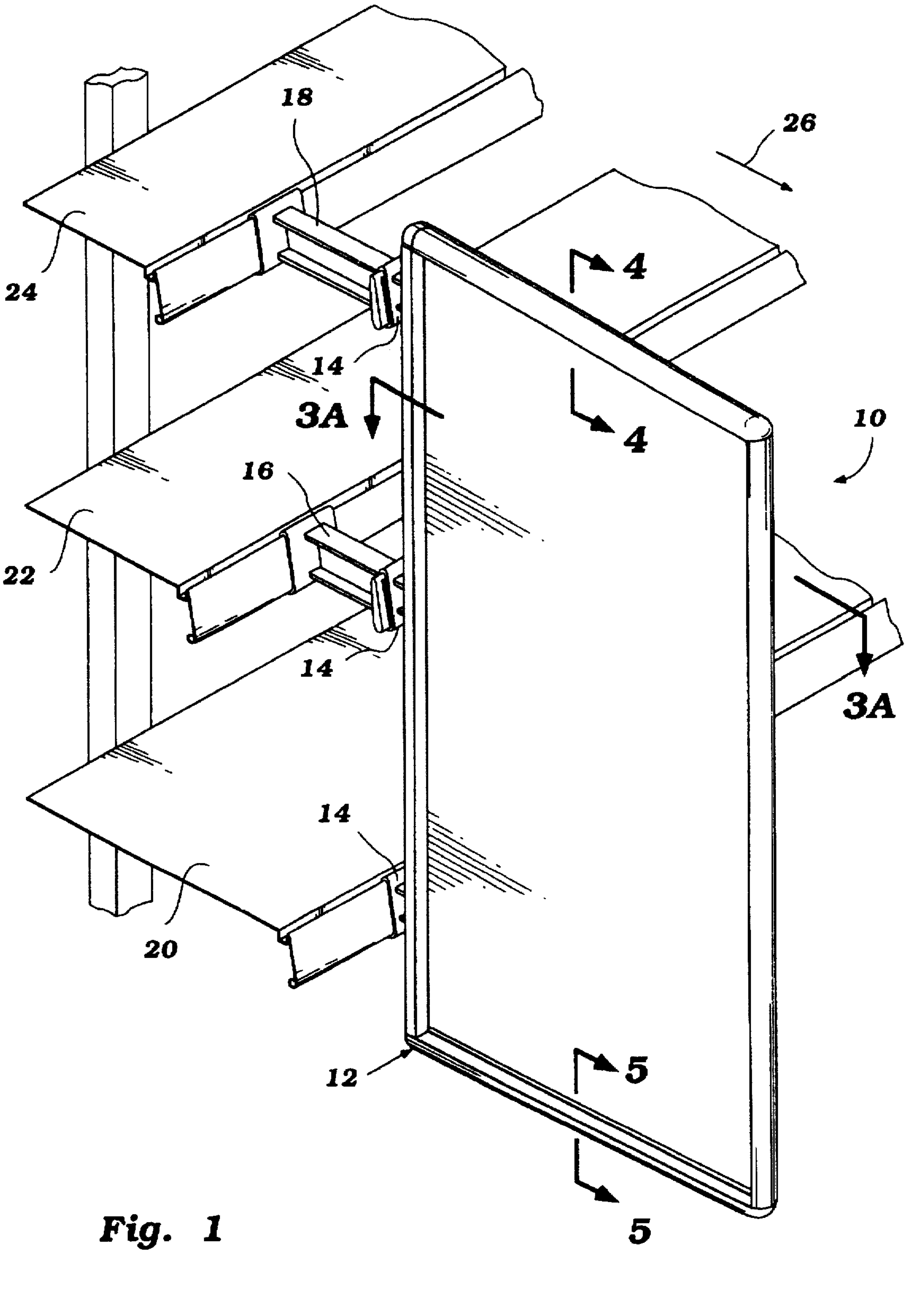
FIG. 1 is a pictorial view of the display holder assembly of the present invention.

Referring now to the drawings, FIG. 1 shows a display holder assembly 10 constructed in accordance with a preferred embodiment of the present invention. Assembly 10 includes a display sign holder 12, a set of display holder brackets 14, and a set of extension pieces 16, 18. Assembly 10 is designed to be mounted on the forward edge rails of cascading display shelves 20, 22, 24, in a manner that supports a display sign in an upright, vertical position.

In the disclosure herein, the term "forward" and "forward direction" are meant to indicate a direction or forward location, as indicated by arrow 26. A "rearward" or "rearward direction" is a direction opposite to arrow 26.

Lower display shelf 20 extends forwardly beyond middle display shelf 22, and middle display shelf 22 extends forwardly of upper display shelf 24. In order to mount display holder 12 in a vertical position, extension pieces 16, 18 are provided in different lengths, depending on the shelf arrangement. In the assembly shown, extension piece 18 is longer that extension piece 16, and no extension piece is used for lower display shelf 20, where lower display holder bracket 14 is mounted directly to lower display shelf 20. While three display holder brackets 14 and a pair of extension pieces 16, 18 are shown as part of mounting assembly 10, the present invention is not meant to be limited to this particular arrangement. Assembly 10 can be mounted to as few as one display shelf and can also be mounted to more than three cascading display shelves. In addition, the shelving does not necessarily have to be cascading. For irregular shelving where an upper shelf extends forwardly of a lower shelf, extension pieces can be rearranged to accommodate staggered, forward edge shelf positions. Also, display holder 12 can be mounted more forwardly of shelving 20, 22, 24 by using longer extension pieces 16, 18 and by providing a extension piece for the lower display holder bracket 14 associated with shelf 20.

Figure 2:
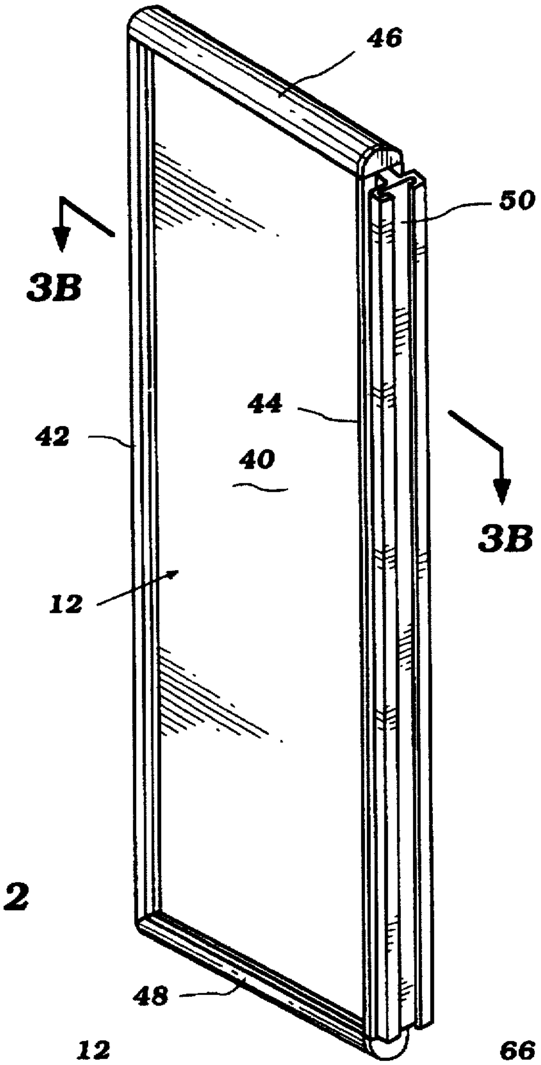
FIG. 2 is a pictorial view of the vertical display holder of the assembly of FIG. 1.

In FIG. 2, display holder 12 is shown in more detail. Display holder 12 includes a center panel 40, a front edge frame strip 42, a back edge frame strip 44, a removable top edge frame cap 46 and a removable bottom edge frame cap 48. An optional, flexible mounting attachment 50 is shown attached to back edge frame strip 44. Flexible mounting attachment 50 is not shown in FIG. 1. Top edge frame cap 46 and bottom edge frame cap 48 are removable so that a display sign can be inserted into or removed from display holder 12, with the side edges of the display sign captured by frame strips 42, 44. Display holder 12 is designed to hold a display sign on both sides of center panel 40, with both front and back signs held by the frame strips, as discussed herein.

Figure 3A:
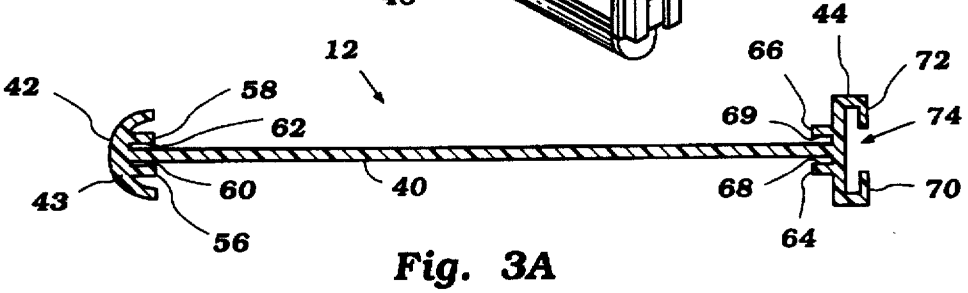
FIG. 3A is a sectional view taken along the lines 3A—3A of FIG. 1.
Figure 3B:
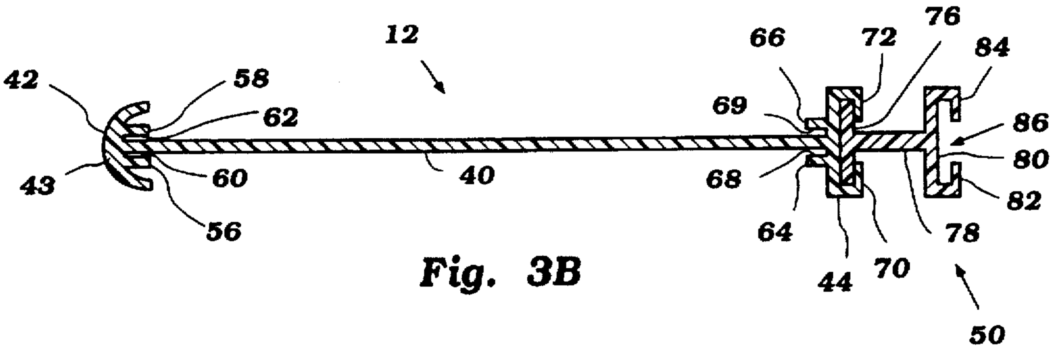
FIG. 3B is a sectional view taken along the lines 3B—3B of FIG. 2, showing an optional flexible mounting strip attached to the display holder.

FIG. 3A is a sectional view of the display holder 12 shown in FIG. 1, and FIG. 3B is a sectional view of the display holder 12 and mounting attachment 50 shown in FIG. 2. In FIGS. 3A–3B, display holder 12 is shown to include center panel 40, front edge frame strip 42 and back edge frame strip 44. Front edge frame strip 42 has a rounded forward surface 43, which helps avoid snagging of a person's clothing as they walk by the display holder. Front edge frame strip 42 also includes a pair of inwardly directed frame flanges 56,58. Frame flanges 56, 58 extend parallel to each other and to center panel 40. A channel 60 is formed by and between center panel 40 and frame flange 56. On the opposite side of center panel 40, a similar channel 62 is formed by and between center panel 40 and frame flange 58. Channels 60,62 are adapted to receive the front side edges of from and back display signs.

Back edge mounting strip 44 includes a pair of inwardly directed frame flanges 64, 66. Frame flanges 64,66, along with center panel 40, form channels 68, 69. Channels 68,69 are designed to receive the rear side edges of from and back display signs. Back edge frame strip 44 also includes a first lip 70 and a second lip 72. First and second lips 70,72 form a vertical slot 74. Slot 74 receives either mounting attachment 50 or display holder brackets 14, discussed in more detail with reference to FIG. 10.

Flexible mounting attachment 50 is generally I-shaped an includes a front flange 76, a flexible web 78, and a back flange 80. Back flange 80 includes a first lip 82 and a second lip 84, which together form a vertical slot 86. Slot 86 is similar in dimension to slot 74 of back edge frame strip 44.

Mounting strip 50 is manufactured by a coextrusion process. A first structural plastic is introduced into a first dye cavity corresponding to front flange 76 and a second dye cavity corresponding to back flange 80, while a second plastic material is introduced into the dye cavity corresponding to web 78. The two plastics bond together as they move through the dye. The structural plastic for flanges 76, 80 is a relatively strong and rigid structural plastic, e.g. rigid PVC. The plastic for web 78 is a strong but resilient plastic, e.g. resilient PVC. The resilient plastic is bendable but returns to its at rest shape when the bending force is removed from it. Flexible web 78 allows display sign holder 12 to pivot should a person bump into it. The remaining components of assembly 10 are also made from a rigid structural plastic material, similar to that used for flanges 76, 80 of mounting attachment 50.

Figure 4:
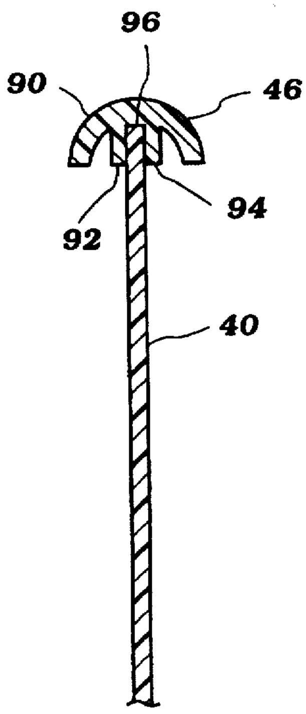
FIG. 4 is a sectional view taken along the lines 4—4 of FIG. 1, showing the connection between the top frame cap and the center panel of the display holder.
Figure 5:
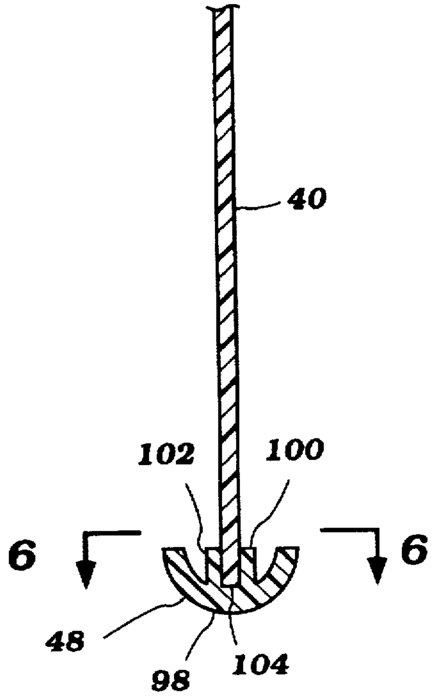
FIG. 5 a sectional view taken along the lines 5—5 of FIG. 1, showing the connection between the bottom frame cap and the center panel of the display holder.

Referring to FIGS. 4–8, top edge frame cap 46 and bottom edge frame cap 48 are shown in more detail. In FIG. 4, top edge frame cap 46 includes an outer, rounded surface 90 and a pair of inwardly directed flanges 92, 94. Flanges 92, 94 form between them a channel 96. Channel 96 receives the top edge of center panel 40 in a snug, frictional engagement. Bottom frame cap 48, like top frame cap 46, includes an outer, rounded surface 98 and a pair of inwardly directed flanges 100,102. Flanges 100,102 form a channel 104 between them for receiving the bottom edge of center panel 40 in a snug, frictional engagement.

Figure 6:
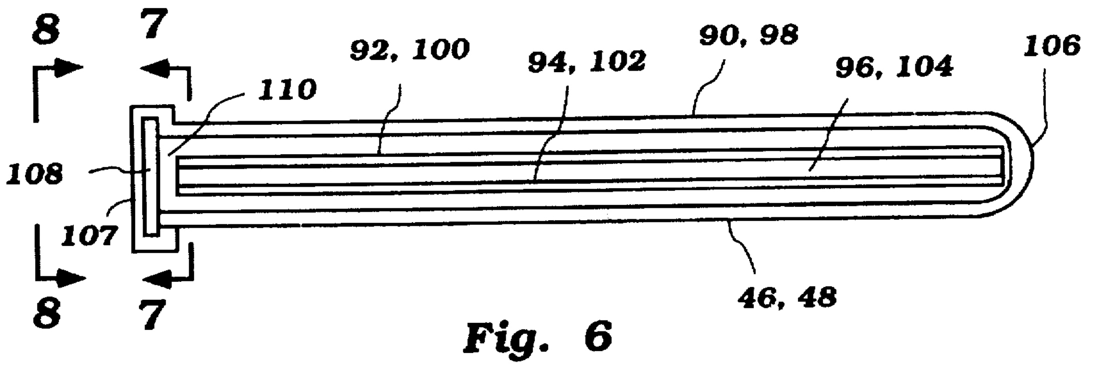
FIG. 6 is a inside plan view of the bottom frame cap taken substantially from the position of line 6—6 of FIG. 5.
Figure 7:
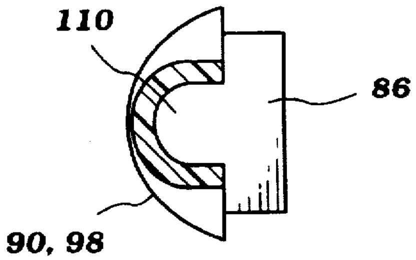
FIG. 7 is a sectional view taken substantially along the line 7—7 of FIG. 6.
Figure 8:
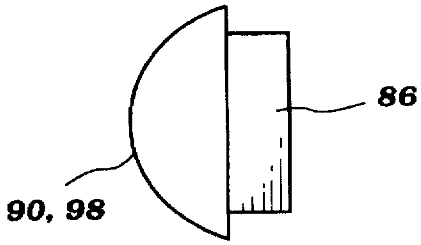
FIG. 8 is a sectional view taken substantially along the line 8—8 of FIG. 6.

FIGS. 6–8 show further details of top and bottom frame caps 46, 48. Top and bottom frame caps 46,48 are identical, so the designs of FIGS. 6–8 illustrate the features of both frame caps. As shown in FIG. 6, the end of frame cap 46, 48 is rounded at 106, to conform with the rounded outer surface of front edge frame strip 42. The rear side of frame caps 46, 48 includes a squared end 107, which conforms with back edge frame strip 44. End 107 includes a tongue 108 that extends inwardly into the slot 74 formed by back edge frame strip 44. A space 110 is provided to receive the central portion of back edge frame strip 44.

Figure 9A:
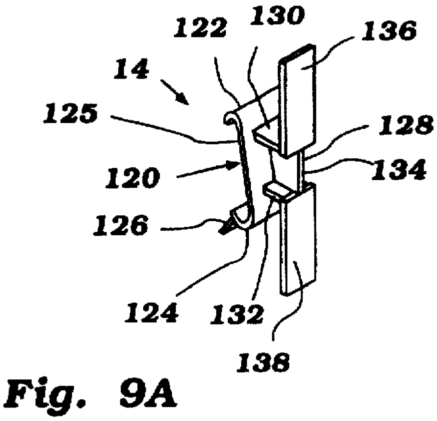
FIGS. 9A–9B are back and front pictorial views of the display holder bracket of FIG. 1.
Figure 9B:
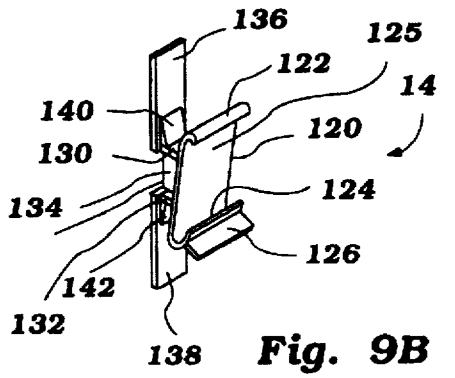

FIGS. 9A–9B show a display holder bracket 14. The view of display holder bracket 14 of FIG. 9A is like that of FIG. 1, while the view of FIG. 9B has the display holder bracket rotated around 180 degrees. Display holder bracket 14 includes an elongated, C-shaped clamp 120 formed by an upper U-shaped rail 122, a lower U-shaped rail 124 and a central backing 125. Lower U-shaped rail 124 is larger, i.e. has a greater radius, than upper U-shaped rail 122. U-shaped rails 122, 124 are joined by backing 125 in a manner that permits the two rails to move apart slightly so that the clamp can be pressed against and snap-fitted onto the forward edge rail of a shelf.

Lower U-shaped rail 124 includes a handle flange 126. Handle flange 126 extends downwardly and rearwardly from lower rail 124. Handle flange 124 provides a handle to assist a user to remove bracket 14 from a shelf, as discussed later.

A central I-beam portion or stem 128 extends from C-shaped clamp 120. Stem 128 includes an upper flange 130, a lower flange 132, and a central web 134. An upper slide 136 extends upwardly from flange 130. A lower slide 138 extends downwardly from flange 132. Slides 136, 138 are wider than flanges 130, 132. Flanges 130, 132 are narrow enough to fit between the lips 70, 72 of back frame strip 44 and the lips 82, 84 of mounting attachment 50. In this manner, slides 136, 138 can be inserted into either slot 74 of back edge frame strip 44 or slot 86 of mounting strip 50. A pair of gussets 140, 142 (FIG. 9B) are provided to reinforce slides 136, 138. Stem 128 and slides 136, 138 together form a display holder mount, which along with clamp 120, mounts display holder 12 to a shelf.

Figure 10:
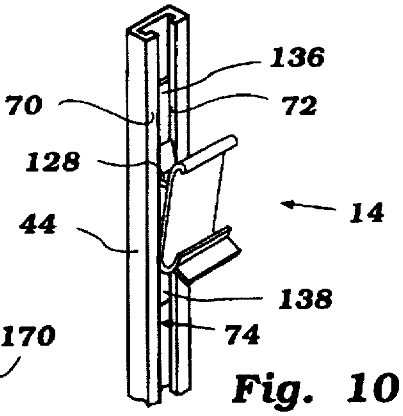
FIG. 10 is a pictorial view of the display holder bracket of FIGS. 9A–9B, shown mounted in the back edge frame strip of the display holder of FIG. 1.

FIG. 10 illustrates display holder bracket 14 inserted into slot 74 of back edge frame strip 44. Upper slide 136 and lower slide 138 are captured and held by friction within slot 74. Stem 128 of bracket 14 is narrow enough to fit between lips 70, 72. Bracket 14 can be adjustably positioned in slot 74 by simply sliding it up and down the slot to a desired position.

Figure 11A:
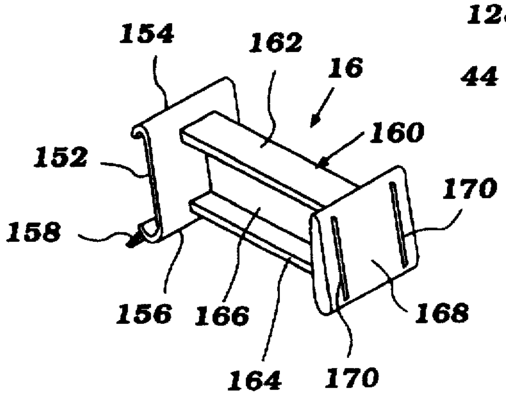
FIGS. 11A–11B are back and front views of an extension piece that forms part of the bracket assembly of FIG. 1.
Figure 11B:
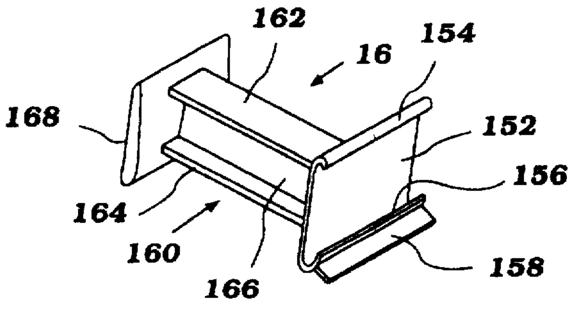

Referring to FIGS. 11A–11B, a first, short extension piece 16 is shown. Extension piece 16 is shown in FIG. 10A as it is shown in FIG. 1, and is oriented around 180 degrees in FIG. 10B. Extension piece 16 includes an elongated, C-shaped clamp 152 that is identical in shape to C-shape clamp 120 of display holder bracket 14. C-shaped clamp 152 includes an upper U-shaped rail 154 and a lower, wider U-shaped rail 156. A handle flange 158 is also provided. The central portion or stem 160 of extension piece 16 is an extended I-shaped beam member, including an upper flange 162, a lower flange 164, and a central web 166. The length of central portion 160 is selected so that extension piece 16 corresponds in length to the distance between the forward edges of adjacent shelves.

A wedge shaped rail segment 168 is located at the front end of central portion 160. Rail segment 168 is shaped to conform to the inside dimensions of C-shaped clamp 120 of display holder bracket 14. As such, it has similar cross-sectional dimensions to the front rail of shelving 20,22,24. Rail segment 168 includes a pair of spaced ribs 170. Ribs 170 are spaced apart a distance approximately equal to the width of C-shaped clamp 120. As such, with display holder bracket 14 snap fitted onto rail segment 168, the side edges of C-shaped clamp 120 are engaged by ribs 170. This functions to keep display holder bracket 14 aligned on extension piece 16.

Figure 12A:
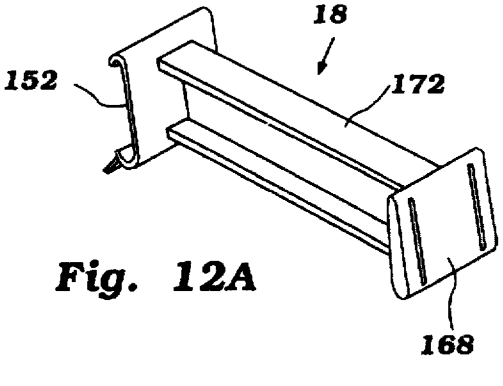
FIGS. 12–12B are back and front pictorial views of an extension piece that is like the extension piece of FIGS. 11A–11B, but which are longer.
Figure 12B:
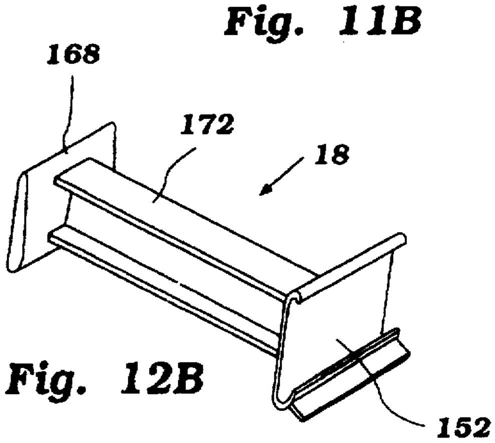

FIGS. 12A–12B show a longer extension piece 18. The design of extension piece 18 is identical with that of extension piece 16, expect that the central portion 172 of extension piece 18 is longer than the central portion 160 of extension piece 16.

Figure 13:
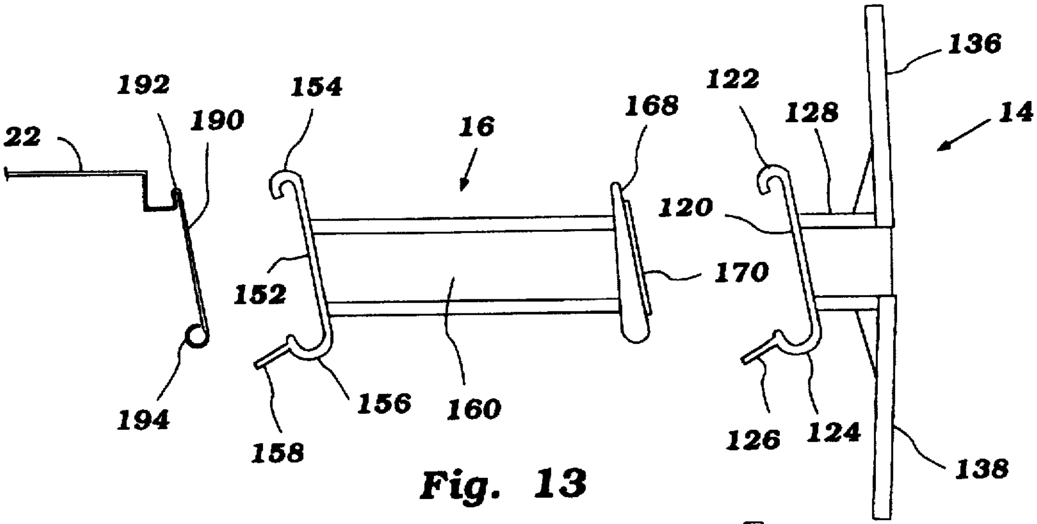
FIG. 13 is an exploded side view of a portion of a display shelf, the extension piece of FIGS. 11A–11B, and the display holder bracket of FIGS. 9A–9B.

FIG. 13 is an exploded view of extension piece 16, display holder 14 and a front segment of a display shelf, which for example may be display shelf 22. Display shelf 22 (as well as the other shelves) includes an angled forward edge rail facing 190 that is angled downwardly and slightly forwardly. Front rail facing 190 includes a narrow upper edge 192 that is slightly rounded and a wider, rounded bottom edge 194. Lower edge 194 is positioned forwardly of upper edge 192. In this manner, the angle of rail facing 190 is approximately equal to the angle of clamp 152 and clamp 120. Rail facing 190 is shaped to conform with the inner dimensions of C-shaped clamp 152 of extension piece 16, as well as C-shaped clamp 120 of display holder bracket 14. Upper U-shaped rail 154 fits around upper edge 192, while lower U-shaped rail 156 fits around the bottom edge 194. This provides a tight, snap-on fit that rigidly secures the extension piece to the shelf.

Handle flange 158 is used to remove extension piece 16 from rail facing 190. Handle flange 158 allows bottom edge 156 to be removed from edge 194 first, so that upper edge 154 can be lifted from upper edge 192. Likewise, handle flange 126 of C-shaped clamp 120 is used for the same purpose to remove C-shaped clamp from rail segment 168 of extension piece 16.

As can be seen, rail segment 168 is shaped substantially in the form of rail facing 190. The upper and lower edges of rail segment 168 correspond to the shaping of upper edge 192 and lower edge 194 of rail facing 190. This allows clamp 120 to mount either to rail segment 168 or to rail facing 190.

Figure 14:
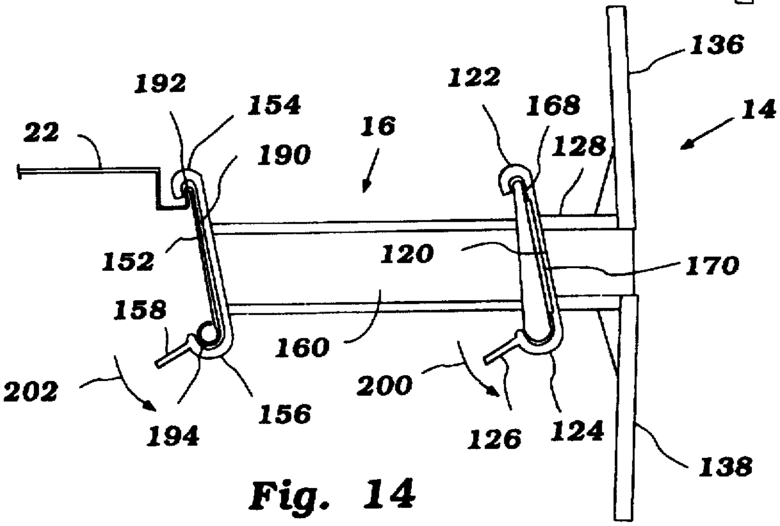
FIG. 14 is an assembled view of the components of FIG. 13.

FIG. 14 shows extension piece 16 clamped on to rail facing 190 of shelf 22 and C-shaped clamp 120 clamped on to rail segment 168 of extension piece 16. To remove display holder bracket 14 from extension piece 16, handle flange 126 is pulled in a direction of arrow 200. Likewise, to remove extension piece 16 from shelving 22, handle flange 158 is pulled in the direction of arrow 202.

Figure 15:
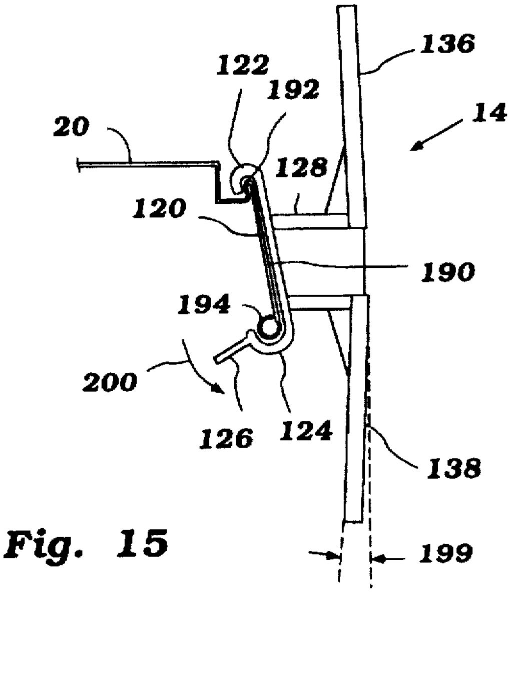
FIG. 15 is a view like FIG. 14 with the extension piece removed and the display holder bracket clamped directly to a shelf.

FIG. 15 shows display holder bracket 14 mounted directly to rail facing 190 of shelf 20. As can be seen in this figure, the stem 128 of bracket 14 is configured to orient C-shaped clamp 120 at an angle from vertical. This angle corresponds with the angular orientation of rail facing 190.

As can be seen in FIGS. 13–15, slides 136, 138 of bracket 14 are canted rearwardly at a slight angle from vertical, as shown by arrow 199 in FIG. 15. This canting increases the frictional force between the slides and the inner walls of vertical slot 74. As such, adjustment is easier because bracket 14 maintains a selected position.

Figure 16:
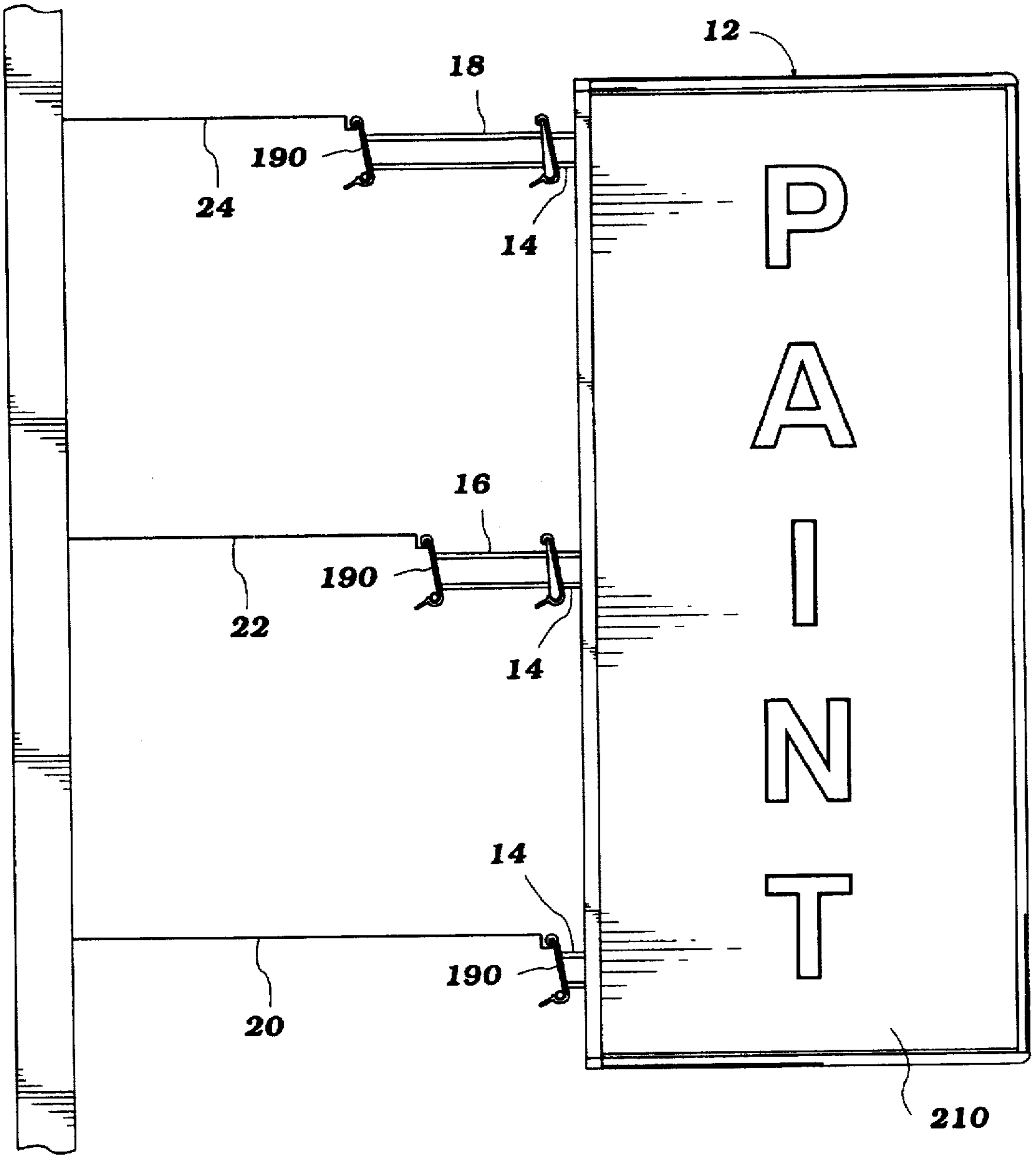
FIG. 16 is a side view of the display holder assembly of the present invention shown holding a display sign in a vertical, upright orientation.

FIG. 16 is a side view of the display holder assembly 10, shown with a display sign 210 carried by display holder 12. As can be seen, display sign 210 is held in an upright, vertical position, and mounted to the front rail facings 190 of shelving 20, 22, 24. In FIG. 16, it can also be seen that the distance that shelf 20 extends forwardly of shelf 22 is approximately equal to the length of extension piece 16. Likewise, extension piece 18 corresponds in length to the distance between the rail facings of shelves 20, 24.

Figure 17:
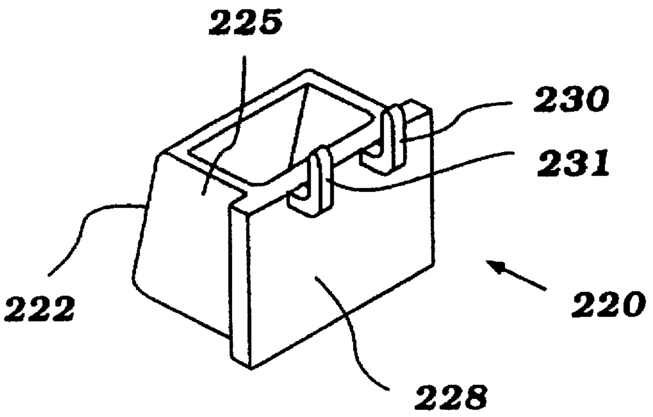
FIG. 17 is a side isometric view of a support adaptor for the holder brackets and extensions of FIGS. 9–16.
Figure 18:
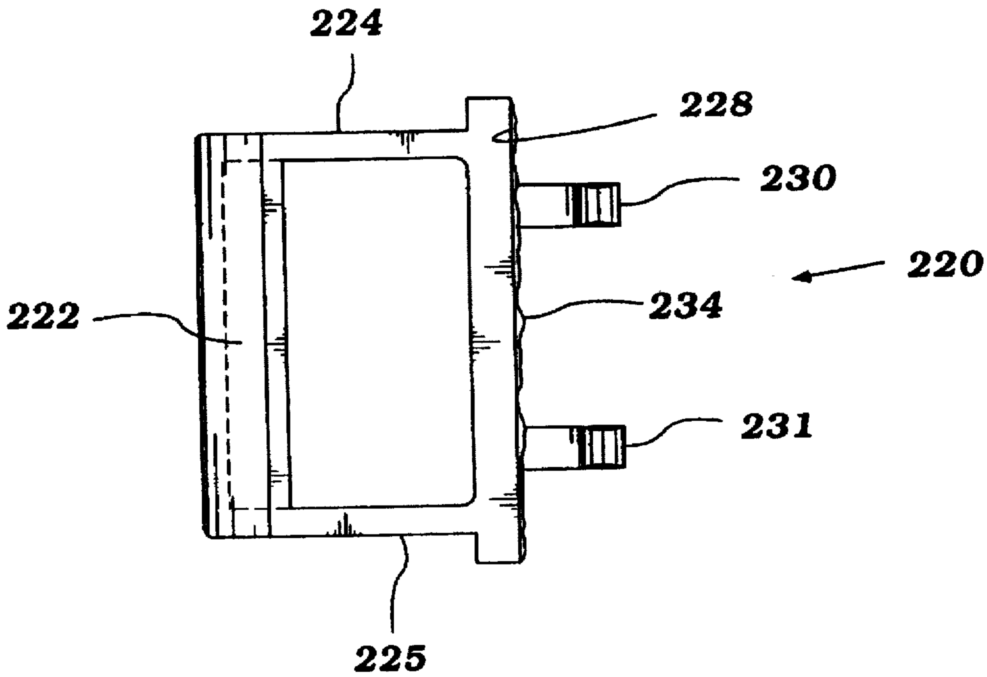
FIG. 18 is a top view of the support adaptor of FIG. 17.

FIGS. 17–18 show a support adaptor 220 for attachment of the C-shaped clamps 120 to a pegboard surface (not shown). In cases where a front rail facings 190 of shelving 20,22,24 is unavailable, the support adaptor 220 is installed. A front face 222 is supported by two side plates 224, 225. A back plate 228 has supports, shown as pegboard pins 230, 231. Alternatively, fasteners (not shown), magnets (not shown) or adhesive 234 may be used to secure the support adaptor 220 to a surface. The support adaptor 220 may also be secured to a horizontal surface, provided that enough room is provided for attachment of the C-shaped clamps 120 to the front face 222.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalents and reversal of parts.

What is claimed is:

1. For use in combination with a horizontally disposed shelf that has a forward edge rail with an upper edge and a lower edge, and with a display holder adapted to carry a display sign in a vertical, forwardly extending position, a display holder bracket assembly characterized by:

a) a clamp having an upper U-shaped portion for grabbing the upper edge of the forward edge rail and a lower U-shaped portion for grabbing the lower edge of the forward edge rail, the upper and lower U-shaped clamps being joined in a manner that permits the two U-shaped clamps to move apart so that the clamp can be pressed against and snap-fitted onto the forward edge rail, and b) a display holder mount extending from the clamp, the display holder mount adapted to support the display holder in its vertical, forwardly extending position.

2. The bracket assembly of claim 1, wherein the clamp includes a central backing that joins the two U-shaped portions to form an elongated, substantially C-shaped clamp.

3. The bracket assembly of claim 1, wherein the display holder includes a vertical slot along its back edge and the display holder mount includes a stem extending from the clamp and a slide extending laterally from the stem for inserting into the vertical slot of the display holder.

4. The bracket assembly of claim 1, and further comprising an extension piece having a first end with a clamp adapted to clamp to the forward edge rail of the shelf in a manner similar to the clamp of the bracket, and a second end having a rail segment piece similar to the forward edge rail, the bracket clamp adapted to clamp onto the rail segment piece.

5. The bracket assembly of claim 4, and further comprising at least two extension pieces of different lengths, whereby the display holder can be secured to cascading shelves by means of at least two such brackets, one or more of which are mounted to the shelf by means of an extension piece.

6. The bracket assembly of claim 4, wherein the rail segment piece includes a pair of spaced ribs, and the clamp of the bracket includes side edges that engage the spaced ribs when the bracket is attached to the extension piece, the ribs maintaining the position of the bracket laterally on the extension piece.

7. The bracket assembly of claim 4, wherein the clamp of the extension piece includes a handle.

8. The assembly of claim 5, wherein the extension piece includes a forward end that is shaped sectionally substantially in the form of the rail facing of the shelf, so that a first bracket can be clamped either to the rail facing or the forward end of the extension piece.

9. The assembly of claim 5, wherein the first and second brackets include slot mounts and the display holder includes a vertical slot along its rear edge, the slot mounts of the first and second brackets adapted to slide in the vertical slot, and wherein the slot mounts are adapted to frictionally engage the display holder so that the first and second brackets can be selectively adjusted along the vertical slot.

10. The assembly of claim 7, wherein the slot mounts are canted rearwardly at a slight angle.

11. The assembly of claim 7, further including a support adaptor having a front face is supported by an external surface, and the front face matches a profile of the forward edge rail of said horizontally disposed shelf.

12. The assembly of claim 1, further including a support adaptor having a front face that is supported by an external surface, and the front face matches a profile of the forward edge rail of said horizontally disposed shelf.

13. For use in combination with a pair of horizontally disposed shelves that each have a forward edge, and with a display holder adapted to carry a display sign in a vertical, forwardly extending position, a display holder assembly characterized by a) a first bracket adjustably mounted to the display holder, the first bracket adapted to clamp onto the forward edge of a first shelf, b) a second bracket adjustably mounted to the display holder, and an extension piece adapted to attach to the second bracket and to clamp onto the forward edge of a second shelf, and c) wherein the first shelf is positioned forwardly of the second shelf a distance approximately equal to the length of the extension piece, so that a display sign is held by the assembly in an upright, vertical position.

14. The assembly of claim 13, wherein the forward edges of the first and second shelves include an angled rail facing with an upper edge and a lower edge, the lower edge being positioned forwardly of the upper edge, and wherein the first and second brackets include U-shaped edges that form a clamp that is adapted to clamp onto the upper and lower edges of the rail facing, and wherein the first and second brackets each include a display holder mount for supporting the display holder in a vertical position.

15. The bracket assembly of claim 14, wherein the clamp includes a central backing that joins the two U-shaped portions to form an elongated, substantially C-shaped clamp.

16. The bracket assembly of claim 14, wherein the display holder includes a vertical slot along its back edge and the display holder mount includes a stem extending from the clamp and a slide extending laterally from the stem for inserting into the vertical slot of the display holder.

17. The assembly of claim 13, further including a support adaptor having a front face is supported by an external surface, and the front face matches a profile of the forward edge rail of said horizontally disposed shelf.

* * * * *